United States Patent
Kong

(10) Patent No.: US 9,469,059 B2
(45) Date of Patent: Oct. 18, 2016

(54) APPARATUS FOR INJECTING TWO-TONE INTERIOR PANEL

(71) Applicants: Hyundai Motor Company, Seoul (KR); Kia Motors Corp., Seoul (KR)

(72) Inventor: Byung Seok Kong, Gunpo-si (KR)

(73) Assignees: Hyundai Motor Company, Seoul (KR); Kia Motors Corp., Seoul (KR)

(*) Notice: Subject to any disclaimer, the term of this patent is extended or adjusted under 35 U.S.C. 154(b) by 175 days.

(21) Appl. No.: 14/290,428

(22) Filed: May 29, 2014

(65) Prior Publication Data
US 2015/0165663 A1 Jun. 18, 2015

(30) Foreign Application Priority Data
Dec. 18, 2013 (KR) .................. 10-2013-0158094

(51) Int. Cl.
*B29C 45/14* (2006.01)
*B29C 45/16* (2006.01)

(52) U.S. Cl.
CPC ...... *B29C 45/1671* (2013.01); *B29C 45/14311* (2013.01); *B29C 45/14811* (2013.01); *B29C 2045/14327* (2013.01)

(58) Field of Classification Search
CPC .................... B29C 45/1671; B29C 45/14811; B29C 45/14311; B29C 2045/14327
USPC ........................ 425/127, 129.1, 130, 133.1
See application file for complete search history.

(56) References Cited

U.S. PATENT DOCUMENTS

| | | | | |
|---|---|---|---|---|
| 4,207,049 A * | 6/1980 | Malo | ............ | B29C 37/0028 425/127 |
| 5,651,998 A * | 7/1997 | Bertschi | ............ | B29C 45/1635 425/130 |
| 6,838,027 B2 * | 1/2005 | Brodi, Jr. | ............ | B29C 43/18 264/138 |
| 8,262,968 B2 * | 9/2012 | Smith | ............ | B29C 45/1639 264/254 |
| 8,506,003 B2 * | 8/2013 | Smith | ............ | B29C 44/086 296/146.7 |

FOREIGN PATENT DOCUMENTS

| | | |
|---|---|---|
| JP | 2004-314314 A | 11/2004 |
| JP | 2013-43571 A | 3/2013 |
| KR | 10-2000-0066118 A | 11/2000 |
| KR | 2001-0073709 A | 8/2001 |
| KR | 10-2001-0104019 A | 11/2001 |
| KR | 10-2008-0072427 A | 8/2008 |
| KR | 10-2013-0064596 A | 6/2013 |

* cited by examiner

*Primary Examiner* — Joseph S. Del Sole
*Assistant Examiner* — Thukhanh T Nguyen
(74) *Attorney, Agent, or Firm* — Morgan, Lewis, Bockius LLP

(57) ABSTRACT

An apparatus for injecting a two-tone interior panel may include a skin including a surface portion and a folded portion extending from an end of the surface portion, an upper mold under which the skin is disposed, and a lower mold that slides up or down below the upper mold. When the lower mold is elevated, a portion of the lower mold corresponding to the folded portion may come in indirect contact with the upper mold with the folded portion therebetween, and a portion of the lower mold corresponding to the surface portion may form a space between the lower mold and the surface portion into which a first resin is to be injected.

8 Claims, 3 Drawing Sheets

APPARATUS FOR INJECTING TWO-TONE INTERIOR PANEL

CROSS REFERENCE TO RELATED APPLICATION

The present application claims priority of Korean Patent Application Number 10-2013-0158094, filed on Dec. 18, 2013, the entire contents of which application are incorporated herein for all purposes by this reference.

BACKGROUND OF INVENTION

1. Field of Invention

The present invention relates to an apparatus for injecting a two-tone interior panel that has soft foam and hard foam injected together.

2. Description of Related Art

Typically, an instrument panel in a vehicle includes glove box or the like and is filled with foam such as urethane foam that absorbs shock when the head of a passenger may hit the instrument panel at the time of forward collision.

Further, the instrument panel has a foam layer inside and a skin portion outside integrally. The inside is formed so that it is soft with many blow holes to make it comfort, and the outside is formed so that it is integrated with a hard skin portion having a thickness of 0.2 to 1 mm for better appearance.

Further, a foaming process of such an instrument panel includes producing a skin portion that is a surface layer, then filling the skin portion with urethane foam, and foaming it to manufacture a panel.

In particular, a crash pad requires soft foam and hard foam injected as two tones. In this case, groove is made at the border portion therebetween to spoil the appearance, and the flow of resin is noticeable. Accordingly, the products have less value.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide an apparatus for injecting a two-tone interior panel in which soft foam and hard foam are injected together to form the interior panel.

According to various aspects of the present invention, there is provided an apparatus for injecting a two-tone interior panel, including: a skin including a surface portion and a folded portion extending from an end of the surface portion, an upper mold under which the skin is disposed, and a lower mold that slides up or down below the upper mold, wherein when the lower mold is elevated, a portion of the lower mold corresponding to the folded portion comes in indirect contact with the upper mold with the folded portion therebetween, and a portion of the lower mold corresponding to the surface portion forms a space between the lower mold and the surface portion into which a first resin is to be injected.

After injection of the first resin, the lower mold may be lowered and a second resin may be injected from a side opposite to a side from which the first resin is injected. When the second resin is injected, the folded portion may be pushed by the second resin to be folded under the first resin, such that the folded portion may be inserted in the second resin. Through holes may be formed in the folded portion of the skin, such that when the second resin is injected, the second resin may flow through the through holes to reach under the first resin. A folding line may be caved at a border between the surface portion and the folded portion.

The lower mold may have a pressing portion formed at a position corresponding to a border between the surface portion and the folded portion, such that the border between the surface portion and the folded portion may be pressed by the pressing portion to be sealed when the lower mold is elevated. The lower mold may be provided with an indentation portion that is indented downward and formed below the surface portion.

The first resin may include soft foam and the second resin may include hard foam. The first resin may be injected at a low pressure and the second resin may be injected at a high pressure.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
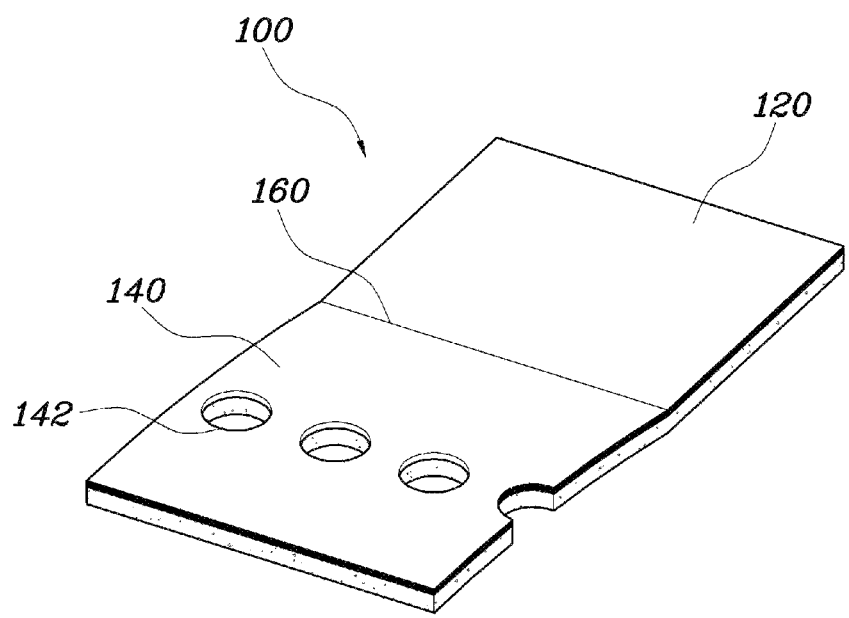
FIG. 1 is a view of a skin of an exemplary apparatus for injecting a two-tone interior panel according to the present invention.
Figure 2:
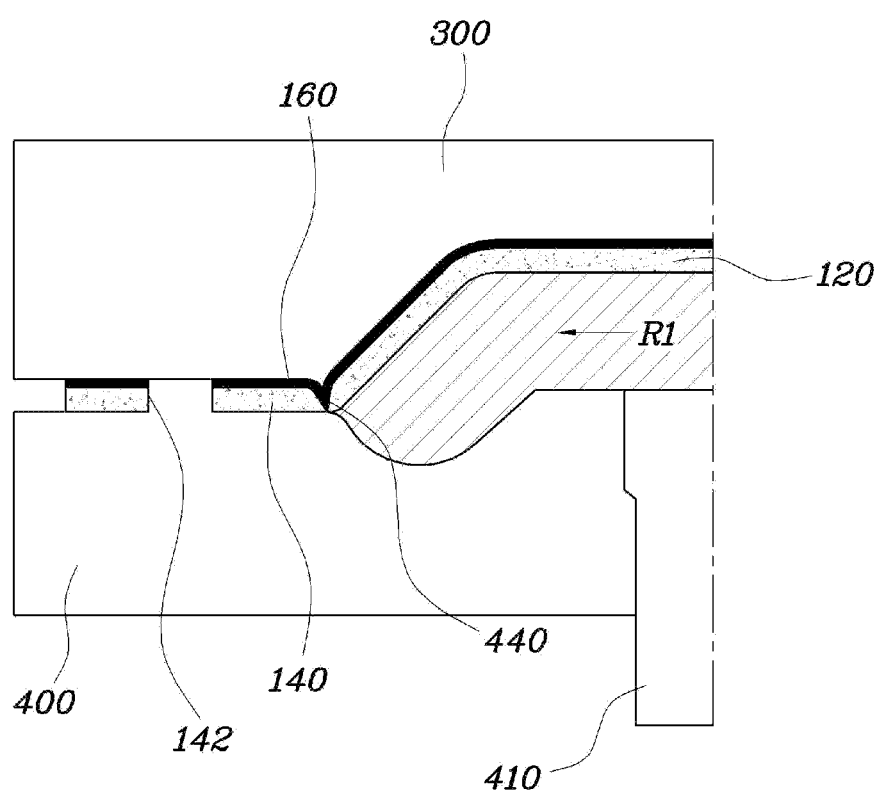
FIG. 2 is a view of injecting first resin by an exemplary apparatus for injecting a two-tone interior panel according to the present invention.
Figure 3:
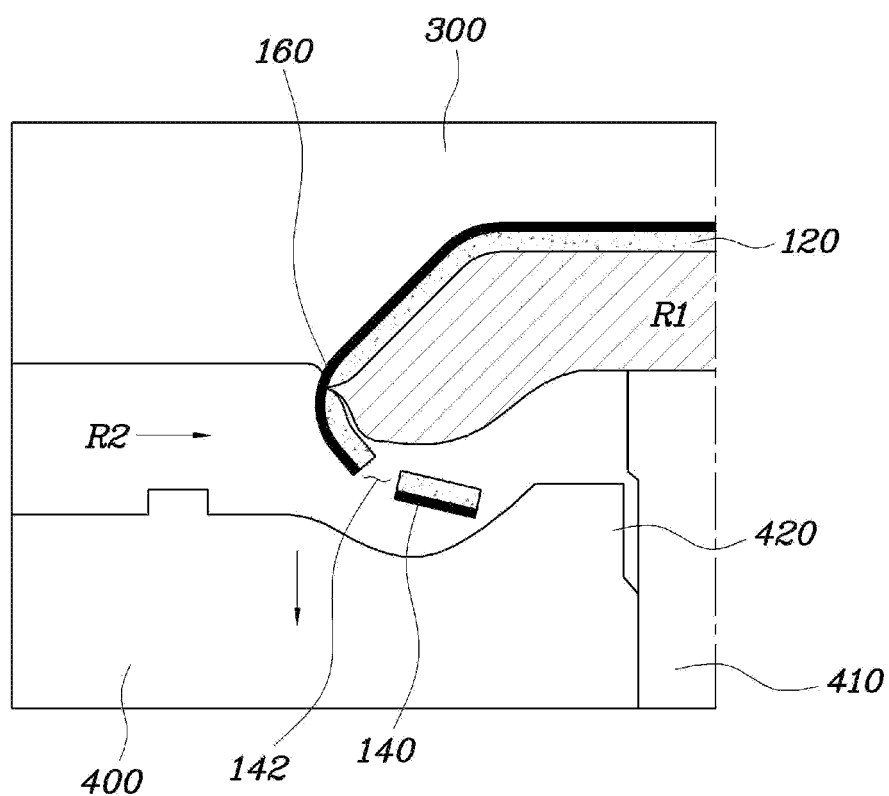
FIG. 3 is a view of injecting second resin by an exemplary apparatus for injecting a two-tone interior panel according to the present invention.

FIG. 1 is a view of a skin of an apparatus for injecting a two-tone interior panel according to various embodiments of the present invention, FIG. 2 is a view of injecting first resin by the apparatus, and FIG. 3 is a view of injecting second resin by the apparatus.

An apparatus for injecting a two-tone interior panel according to various embodiments of the present invention includes: a skin 100 including a surface portion 120 and a folded portion 140 extending from the end of the surface portion; an upper mold 300 under which the skin 100 is located; and a lower mold 400 that slides up and down below the upper mold 300, wherein when the lower mold 400 is elevated, a portion of the lower mold 400 corresponding to the folded portion 140 comes in indirect contact with the upper mold 300 with the folded portion 140 therebetween, and the portion of the lower mold 400 corresponding to the surface portion 120 forms a space between the lower mold 400 and the surface portion 120 into which first resin R1 is injected.

The apparatus according to various embodiments of the present invention injects soft foam with the first resin R1 and then injects hard foam to produce a two-tone interior panel. The soft foam may be formed by using a skin for soft foam as the surface material.

Specifically, as shown in FIG. 1, the skin 100 is composed of the surface portion 120 and a folded portion 140 extended from the end of the surface portion 120. The folded portion 140 is folded into the inside to be inserted therein when the second resin R2 is injected, to thereby enhance the bonding force.

The mold includes the upper mold 300 and the lower mold 400. As shown in FIG. 2, the skin 100 is located under the lower surface of the upper mold 300. The lower mold 400 may be a slider mold and may have a guide mold 410 at a side thereof.

After the skin 100 is located under the lower surface of the upper mold 300, the lower mold 400 is elevated as shown in FIG. 2. At this time, the lower mold 400 slides up and down below the upper mold 300. When it slides up, the portion of the lower mold 400 corresponding to the folded portion 140 comes in indirect contact with the upper mold 300 with the folded portion 140 therebetween, and the portion of the lower mold 400 corresponding to the surface portion 120 forms an injection space into which the first resin R1 is injected between the lower mold 400 and the surface portion 120.

Then, the first resin R1 is injected from the right hand, as shown in FIG. 2. The lower mold 400 has a pressing portion 440 at a location corresponding to the border between the surface portion 120 and the folded portion 140. When the lower mold 400 is elevated, the border between the surface portion 120 and the folded portion 140 is pressed by the pressing portion 440 to be sealed. Therefore, even if the first resin R1 permeates, the first resin R1 does not go over to the left side but is located only under the surface portion 120 of the skin 100 between the upper mold 300 and the lower mold 400.

Then, the lower mold 400 is lowered by a predetermined distance as shown in FIG. 3, and the second resin R2 is injected from the left hand. Here, a folding line 160 is made between the surface portion 120 and the folded portion 140 so that the folded portion 140 can be easily folded. While the folded portion 140 is folded, the second resin R2 is injected from the opposite side to the side where the first resin R1 is injected when the lower mold 400 is lowered. Through holes 142 are formed in the folded portion 140 of the skin 100, such that when the second resin R2 is injected, it may flow through the through holes 142 to reach under the first resin R1 already formed.

That is, when the second resin R2 is injected, the folded portion 140 is pushed by the second resin R2 to be folded under the first resin R1, such that the folded portion 140 may be inserted in the second resin R2. Further, the through holes 142 are formed so that a sufficient amount of the second resin R2 may be supplied via the through holes 142.

Further, the lower mold 400 may be provided with an indentation portion 420 that is indented downward and formed below the surface portion 120.

With this configuration, the two-tone border is made with the folded portion 140 instead of the end of the foam skin. Further, by applying the knife edge for easier folding, the two-tone foam skin can be folded and the width of the groove can be reduced. Further, the border pressed in advance by the pressing portion 440 for sealing the two-tone border when injecting the resin at high pressure has high density. Further, by applying the indentation portion 420 to guide the second resin, the second resin can be prevented from permeating via the border of skins and gaps between molds when injecting the second resin at high pressure.

In various embodiments of the present invention, the first resin may be soft foam and the second resin may be hard foam. Further, the first resin may be injected at low pressure and the second resin may be injected at high pressure.

As set forth above, according to the apparatus for injecting a two-tone interior panel thus configured, the foam skin is folded by the flow of resin injected at high pressure, such that the two-tone border is made with the folded portion instead of the end of the foam skin. Further, by applying the knife edge for easier folding, the two-tone foam skin can be folded and the width of the groove can be reduced.

In addition, when injecting the resin at low pressure, sealing for preventing the resin from moving over the two-tone border to the area in which resin is injected at high pressure can be made. Moreover, the density of the two-tone border pressed in advance for sealing when injecting the resin at high pressure can be increased. Further, by applying a portion to guide resin that moves over, it can prevent the resin from permeating via the foam skin and gaps between molds when injecting the resin at high pressure.

In addition, the contact area between the resin injected at high pressure and the resin injected at low pressure is maximized, such that durability is increased.

For convenience in explanation and accurate definition in the appended claims, the terms "upper" or "lower", "up" or "down", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for injecting a two-tone interior panel, comprising:
    a skin including:
        a surface portion; and
        a folded portion extending from an end of the surface portion and foldable;
    an upper mold under which the skin is disposed; and
    a lower mold sliding up or down below the upper mold, wherein when the lower mold is elevated, a portion of the lower mold corresponding to the folded portion comes in indirect contact with the upper mold with the folded portion therebetween, and a portion of the lower mold corresponding to the surface portion forms a space between the lower mold and the surface portion into which a first resin is to be injected,
    wherein the upper mold and the lower mold are configured such that after injection of the first resin, when the lower mold is lowered a second resin is injected from a side opposite to a side from which the first resin is injected and the folded portion of the skin is folded, and wherein the lower mold is provided with an indentation portion indented downward and formed below the surface portion, and the indentation portion is configured to prevent the second resin from permeating through a gap positioned between the lower mold and the folded portion when the second resin is injected at high pressure.

2. The apparatus of claim 1, wherein when the second resin is injected, the folded portion is pushed by the second resin to be folded under the first resin, such that the folded portion is inserted in the second resin.

3. The apparatus of claim 2, wherein through holes are formed in the folded portion of the skin, such that when the second resin is injected, the second resin flows through the through holes to reach under the first resin.

4. The apparatus of claim 1, wherein a folding line is caved at a border between the surface portion and the folded portion.

5. The apparatus of claim 1, wherein the lower mold has a pressing portion formed at a position corresponding to a border between the surface portion and the folded portion, such that the border between the surface portion and the folded portion is pressed by the pressing portion to be sealed when the lower mold is elevated.

6. The apparatus of claim 1, wherein the lower mold is provided with an indentation portion that is indented downward and formed below the surface portion.

7. The apparatus of claim 1, wherein the first resin comprises soft foam and the second resin comprises hard foam.

8. The apparatus of claim 1, wherein the first resin is injected at a low pressure and the second resin is injected at a high pressure.

* * * * *